(12) United States Patent
Chiu et al.

(10) Patent No.: US 6,248,980 B1
(45) Date of Patent: *Jun. 19, 2001

(54) ION SENSOR GLOW PLUG ASSEMBLY

(75) Inventors: Randolph Kwok-Kin Chiu, Davison; Keith Michael Brenske, Flushing; Haskell Simpkins, Grand Blanc, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/377,355

(22) Filed: Aug. 19, 1999

(51) Int. Cl.⁷ ........................................ F23Q 7/00
(52) U.S. Cl. .................... 219/270; 123/145 A
(58) Field of Search .................. 219/270, 544, 219/260; 123/145 A, 145 R; 361/264–266

(56) References Cited

U.S. PATENT DOCUMENTS

| 4,739,731 | | 4/1988 | Habich . | |
|---|---|---|---|---|
| 5,893,993 | * | 4/1999 | Kurano | 219/270 |
| 5,922,229 | * | 7/1999 | Kurano | 219/270 |
| 6,150,634 | * | 11/2000 | Haussner et al. | 219/270 |
| 6,177,653 | * | 1/2001 | Chiu et al. | 219/270 |

FOREIGN PATENT DOCUMENTS

| 3706555 | * | 1/1988 | (DE) . | |
|---|---|---|---|---|
| 197 37 396 | | 3/1998 | (DE) . | |
| 197 38 915 | | 3/1998 | (DE) . | |
| 4-9517 | * | 1/1992 | (JP) | 219/270 |
| 10-110950 | * | 4/1998 | (JP) . | |
| 10-110951 | * | 4/1998 | (JP) . | |
| 10-110952 | * | 4/1998 | (JP) . | |
| 10-122114 | * | 5/1998 | (JP) . | |
| 97/38223 | | 10/1997 | (WO) . | |

* cited by examiner

Primary Examiner—John A. Jeffery
(74) Attorney, Agent, or Firm—Vincent A. Cichosz

(57) ABSTRACT

An ion sensor glow plug assembly includes a metal shell for attachment to a cylinder head of a compression ignition engine. The ion sensor glow plug assembly also includes a center terminal at least partially disposed in the metal shell and connected to a source of power to create a heating circuit. The ion sensor glow plug assembly includes a metal glow sheath disposed at least partially in the metal shell and about the center terminal. The ion sensor glow plug assembly further includes an insulative seal disposed at least partially around the metal glow sheath to isolate the metal shell from the metal glow sheath to create an ion sensing circuit.

20 Claims, 2 Drawing Sheets

ION SENSOR GLOW PLUG ASSEMBLY

TECHNICAL FIELD

The present invention relates generally to glow plugs for engines and, more particularly, to an ion sensor glow plug assembly for an engine of a vehicle.

BACKGROUND OF THE INVENTION

It is known to provide an ion sensor for an engine of a vehicle. The ion sensor is used as a closed loop feedback to detect fuel injection timing and intensity of combustion in each cylinder of the engine so as to control and improve engine performance.

It is also known to provide a glow plug for a compression ignition engine such as a diesel engine. The glow plug typically has a ceramic tip that extends into a chamber of the engine. The purpose of the glow plug is to aid in cold starting of the diesel engine.

Although the above ion sensors and glow plugs have worked, it is desirable to combine the two to provide an ion sensor glow plug assembly. It is also desirable to provide an ion sensor glow plug assembly that is self-cleaning for soot in a compression ignition engine such as a diesel engine of a vehicle.

SUMMARY OF THE INVENTION

It is, therefore, one object of the present invention to provide an ion sensor glow plug assembly for an engine of a vehicle.

It is another object of the present invention to provide an ion sensor glow plug assembly that is self-cleaning for soot in a compression ignition engine of a vehicle.

To achieve the foregoing objects, the present invention is an ion sensor glow plug assembly including a metal shell for attachment to a cylinder head of a compression ignition engine. The ion sensor glow plug assembly also includes a center terminal at least partially disposed in the metal shell and connected to a source of power to create a heating circuit. The ion sensor glow plug assembly includes a metal glow sheath disposed at least partially in the metal shell and about the center terminal. The ion sensor glow plug assembly further includes an insulative seal disposed at least partially around the metal glow sheath to isolate the metal shell from the metal glow sheath to create an ion sensing circuit.

One advantage of the present invention is that an ion sensor glow plug assembly is provided for an engine of a vehicle. Another advantage of the present invention is that the ion sensor glow plug assembly is self-cleaning for soot in a compression ignition engine such as a diesel engine. Yet another advantage of the present invention is that the ion sensor glow plug assembly incorporates a carbon self-cleaning ion sensor into a glow plug. Still another advantage of the present invention is that the ion sensor glow plug assembly incorporates a metal glow sheath. A further advantage of the present invention is that the ion sensor glow plug assembly allows closed loop control of a compression ignition engine such as a diesel engine.

Other objects, features and advantages of the present invention will be readily appreciated, as the same becomes better understood after reading the subsequent description taken in conjunction with the accompanying drawings.

DESCRIPTION OF THE PREFERRED EMBODIMENT

Figure 1:
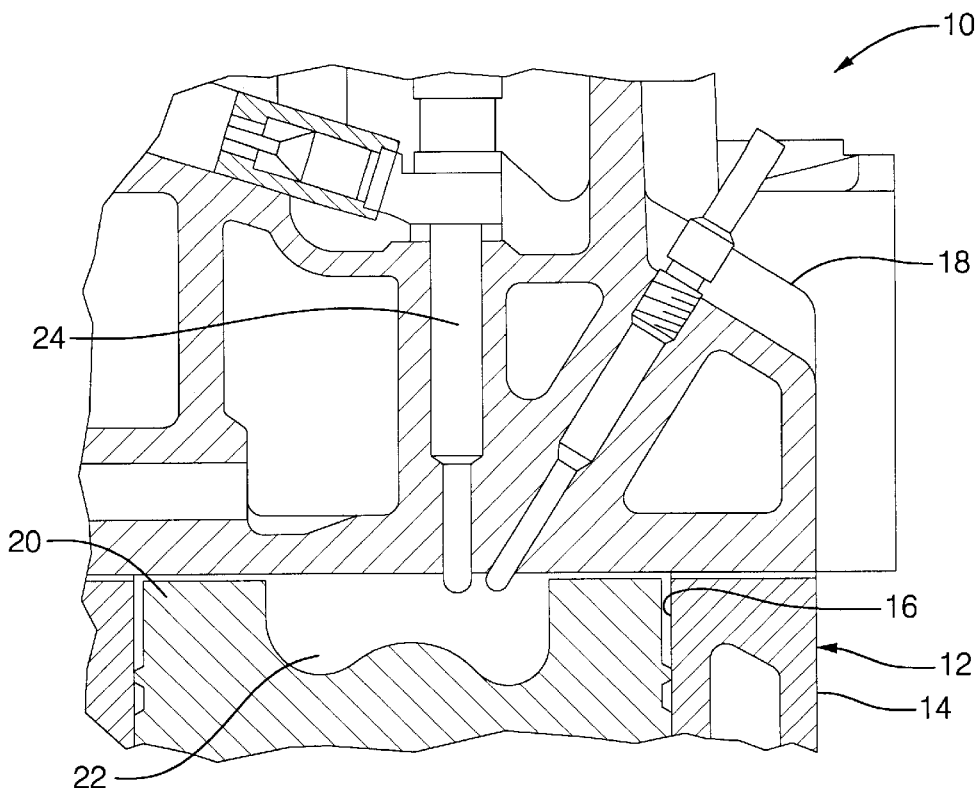
FIG. 1 is a fragmentary elevational view of an ion sensor glow plug assembly, according to the present invention, illustrated in operational relationship with an engine of a vehicle.
Figure 2:
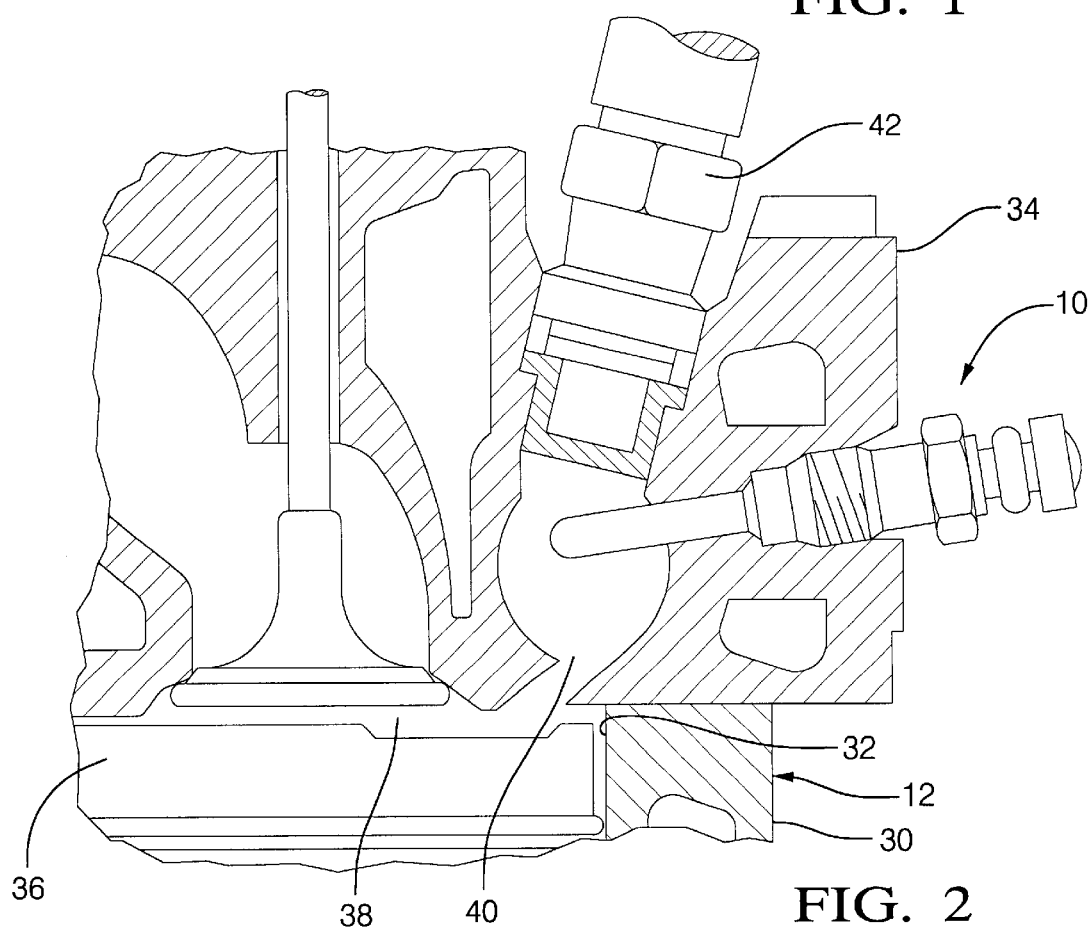
FIG. 2 is a view similar to FIG. 1 of the ion sensor glow plug assembly illustrated in operational relationship with another engine.

Referring to the drawings and in particular FIGS. 1 and 2, one embodiment of an ion sensor glow plug assembly 10, according to the present invention, is shown for a compression ignition engine, generally indicated at 12, such as a diesel engine in a vehicle (not shown). As illustrated in FIG. 1, the compression ignition engine 12 may be an open chamber type diesel engine including a cylinder block 14 defining a cylinder 16 closed by a cylinder head 18. The compression ignition engine 12 also includes a piston 20 reciprocal in the cylinder 16 and defines a recessed bowl, which together with the cylinder head 18 forms a combustion chamber 22. The compression ignition engine 12 includes an injection nozzle or injector 24 mounted in the cylinder head 18 which sprays fuel into the combustion chamber 22 for compression ignition therein. The compression ignition engine 12 further includes the ion sensor glow plug assembly 10 mounted in the cylinder head 18 and extending into the combustion chamber 22 for a function to be described. It should be appreciated that, except for the ion sensor glow plug assembly 10, the compression ignition engine 12 is conventional and known in the art.

As illustrated in FIG. 2, the compression ignition engine 12 may be pre-chamber type diesel engine including a cylinder block 30 defining a cylinder 32 closed by a cylinder head 34. The compression ignition engine 12 also includes a piston 36 reciprocal in the cylinder 32. The piston 36 and cylinder head 34 form a combustion chamber 38, which connects with a pre-combustion chamber or pre-chamber 40 within the cylinder head 34. The compression ignition engine 12 includes an injection nozzle or injector 42 mounted in the cylinder head 34 for injecting fuel into the pre-chamber 40. The compression ignition engine 12 includes the ion sensor glow plug assembly 10 mounted in the cylinder head 34 and extending into the pre-chamber 40 for a function to be described. It should be appreciated that, except for the ion sensor glow plug assembly 10, the compression ignition engine 12 is conventional and known in the art.

Figure 3:
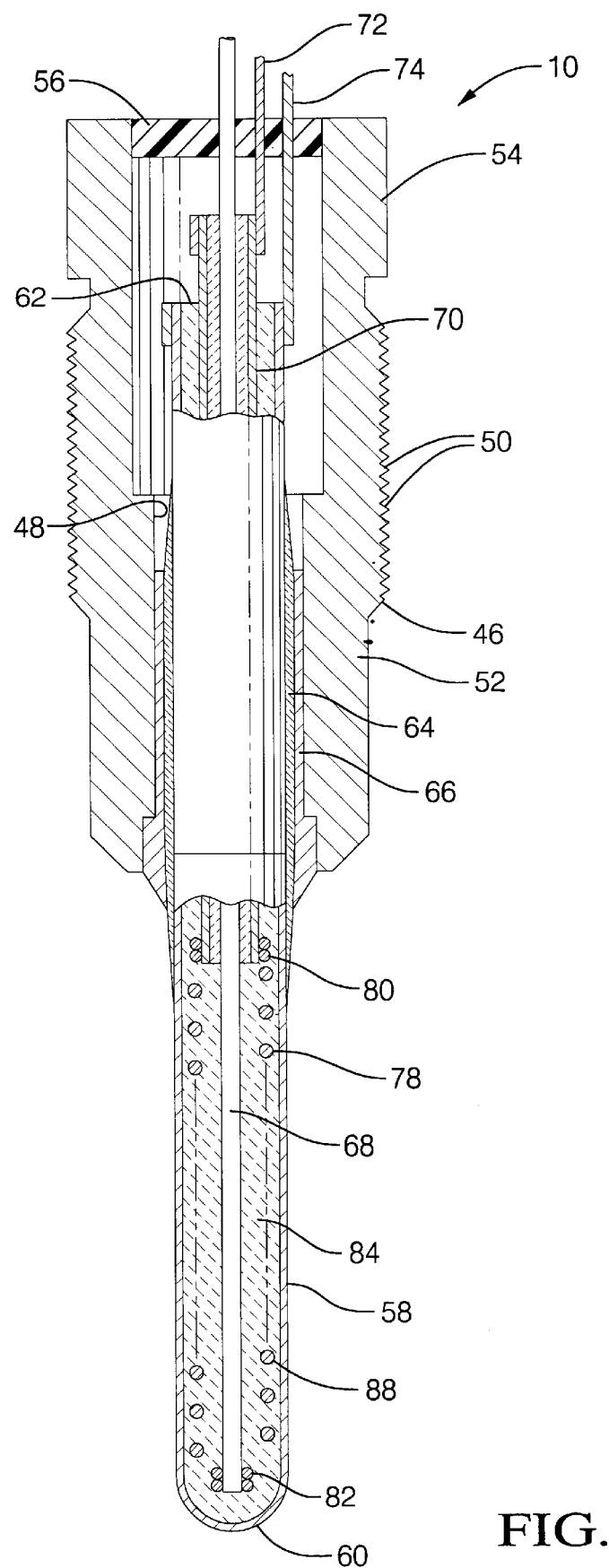
FIG. 3 is a fragmentary elevational view of the ion sensor glow plug assembly of FIGS. 1 and 2.

Referring to FIG. 3, the ion sensor glow plug assembly 10 includes a housing or shell 46 extending axially for engaging the cylinder head 18,34. The shell 46 is generally cylindrical in shape and has a passageway 48 extending axially therethrough. The shell 46 has a plurality of exterior threads 50 for threaded engagement with the cylinder head 18,34. The exterior threads 50 are of a ten millimeter (10 mm) type. The shell 46 has a reduced diameter end 52 adjacent one end of the exterior threads 50 forming a shell seat 53 and a hexagonal shaped end 54 adjacent the other end of the exterior threads 50 for a function to be described. The hexagonal shaped end 54 is of a ten millimeter (10 mm) type. The shell 46 is made of a metal material such as steel.

The ion sensor glow plug assembly 10 may include a seal 56 disposed partially in the passageway 48 at the hexagonal shaped end 54 of the shell 46 and an electrical connector 58 such as a tr-axial mating connector disposed adjacent the seal 56 for a function to be described. The seal 56 is made of either a plastic or elastomeric material. It should be appreciated that the electrical connector 58 mates with terminals of the ion sensor glow plug assembly 10.

The ion sensor glow plug assembly 10 also includes an insulator 60 partially disposed in the shell 46 and extending into the passageway 48. The insulator 60 is generally cylindrical in shape and extends axially. The insulator 60 has a passageway 62 extending axially therethrough. The insulator 60 has an insulator seat 64 extending radially outwardly and axially. The insulator 60 is made of a ceramic material such as alumina. The insulator 60 is extended into a glow area of a glow sheath 78 to be described to glow the glow sheath 78 and clean off any soot (carbon) that may induce a short circuit between the shell 46 and glow sheath 78. It should be appreciated that the shell seat 53 is crimped to retain the insulator 60 to the shell 46.

The ion sensor glow plug assembly 10 includes a gasket or seal 66 disposed between the insulator 60 and the shell 46 to provide vibration damping and mechanical support. The gasket 66 is made of a relatively soft material such as copper or steel. The gasket 66 is disposed in the passageway 48 between the shell seat 53 and the insulator seat 64.

The ion sensor glow plug assembly 10 includes a coating 68 disposed about one end of the insulator 60. The coating 68 is generally cylindrical in shape and extends axially over the insulator seat 64 of the insulator 60. The coating 68 has an aperture 70 extending axially therethrough. The coating 68 is made of an insulating material such as polyamide, preferably PI 2545. The ion sensor glow plug assembly 10 includes a matting 71 disposed in the passageway 48 adjacent the coating 68. The matting 71 is generally annular and made of an insulating material such as intumescent fiber. It should be appreciated that the coating 68 and matting 71 prevent soot and/or humidity from shorting a surface of a seal 72 to be described.

The ion sensor glow plug assembly 10 includes a seal 72 disposed adjacent one end of the matting 71. The seal 72 is generally cylindrical in shape and has an aperture 74 extending axially therethrough. The seal 72 is made of an insulating material such as glass and is pre-formed. The ion sensor glow plug assembly 10 includes a seal ring 76 disposed about the seal 72 and overlapping one end of the matting 71. The seal ring 76 is generally annular and made of an insulating material such as Inconel 600. It should be appreciated that the seal 76 isolates the shell 46 from a glow sheath 78 to be described to create an ion sensing circuit.

The ion sensor glow plug assembly 10 includes a glow sheath 78 partially disposed in the passageway 48 of the shell 46. The glow sheath 78 is generally cylindrical and tubular in shape. The glow sheath 78 has a closed end 80 spaced axially from the end of the insulator 60. The glow sheath 78 extends axially from the closed end 80 through the apertures 62 and 74 of the insulator 60 and seal 72, respectively, to an open end 82. The open end 82 matingly engages the electrical connector 58. The glow sheath 78 is made of a metal material such as Inconel 601 or 600. The glow sheath 78 is secured by the seal 72 and seal ring 76 and subsequently press-fitted and secured into the shell 46.

The ion sensor glow plug assembly 10 includes a center or centerwire terminal 84 disposed within the glow sheath 78. The center terminal 84 is generally cylindrical in shape and extends axially. The center terminal 84 has one end spaced axially from the closed end 80 of the glow sheath 78 and extends axially to another end that matingly engages the electrical connector 58. The center terminal 84 is made of a metal material such as nickel (Ni) or nickel-chromium (Ni—Cr).

The ion sensor glow plug assembly 10 includes an inner tube 86 disposed about a portion of the center terminal 84. The inner tube 86 has one end spaced a predetermined distance such as fifty (50) to eighty (80) millimeters (mm) from the closed end 80 of the glow sheath 78. The inner tube 86 extends axially to a second end spaced a predetermined distance from the other end of the center terminal 84 and matingly engages the electrical connector 58. The inner tube 86 is made of a metal material such as nickel (Ni) or the like. It should be appreciated that the inner tube 86 is spaced radially from the center terminal 84. It should also be appreciated that the axial distance from the end of the inner tube 86 to the end of the glow sheath 78 is a high temperature glow area or glow tip of the glow sheath 78.

The ion sensor glow plug assembly 10 includes an electrical coil 88 disposed about a portion of the center terminal 84. The electrical coil 88 has a first or current regulating portion 90 having one end disposed about the inner tube 86 and extending axially. The current regulating portion 90 is connected to the inner tube 86 by suitable means such as welding. The current regulating portion 90 is made of a metal material such as nickel-iron (Ni—Fe) or cobalt-iron (Co—Fe). The electrical coil 88 has a second or heating portion 92 disposed about the end of the center terminal 84. The heating portion 92 has one end connected to the current regulating portion 90 by suitable means such as spot welding and another end connected to the end of the center terminal 84 by suitable means such as spot welding. The heating portion 92 is made of a metal material such as nickel-chromium (Ni—Cr) or iron-chromium-aluminum (Fe—Cr—Al). It should be appreciated that the inner tube 86 and center terminal 84 act as terminals for the electrical coil 88 to create a heating circuit and are connected to the electronic connector 58, which, in turn, is connected to an electronic controller (not shown). It should be appreciated that the controller is conventional and known in the art.

The ion sensor glow plug assembly 10 further includes a filling material compound 94 disposed in the glow sheath 78 and inner tube 86. The filling material 94 is made of a ceramic material such as magnesia or alumina. The filling material 94 is a plurality of ceramic tubes disposed in the open end of the glow sheath 78 and inner tube 86 which are crushed to fill the glow sheath 78 and inner tube 86. The filling material 94 is disposed between the electrical coil 88 and center terminal 84 and between the inner tube 86 and center terminal 84 and between the inner tube 86 and glow sheath 78. The filling material 94 provides mechanical support of the center terminal 84, electrical coil 88 and inner tube 86 in an x-y direction. The filling material 94 also acts as a heat conductor from the electrical coil 88 to the glow sheath 78 during glowing.

To assemble the ion sensor glow plug assembly 10, the heating portion 92 of the electrical coil 88 is joined such as by welding to the current regulating portion 90 of the electrical coil 88. The heating portion 92 is then joined such as by welding to the center terminal 84, which is the first heater terminal. The current regulating portion 90 of the electrical coil 88 is joined such as by welding to the inner tube 86, which is the second heater terminal. Crushable ceramic tubes, made of magnesia or alumina, are then inserted to the inside and outside of the terminals/electrical coil 88, which is, in turn, inserted into the glow sheath 78. The glow sheath 78 is then swaged to a smaller size to crush and compact the filling material 94. The glow sheath 78 is then glass sealed using the seal ring 76 and seal 72 in a conveyor belt furnace (not shown) with a heating and cooling temperature profile up to a maximum temperature of one thousand degrees centigrade (1000° C.). The glass sealed glow sheath assembly 78,72,76 is then press-fitted into the shell 46 through its lower end. The matting 70, having a decomposition temperature of seven hundred degrees centigrade (700° C.), is then inserted into the passageway 48 between the lower end of the seal 72 and the inner diameter of the shell 46. The coating 68 may also be added. The insulator 60 and gasket 66 are then inserted into the passageway 48 and the shell 46 is crimped over the gasket 66 to form the shell seat 53. The shell seat 53 is then machined. The ion sensor glow plug assembly 10 is then heated at one hundred twenty degrees centigrade (120° C.) for approximately thirty (30) minutes to cure the coating 68. The electrical connector 58 and seal 56 are then inserted into the upper or open end of the passageway 48 of the shell 46, making connections to the heater terminals of the center terminal 84 and inner tube 86 and ion sensor terminal or glow sheath 78. The ion sensor glow plug assembly 10 is then completely assembled.

In operation of the ion sensor glow plug assembly 10, current flows from the electrical connector 58 to the center terminal 84, which passes through the heating portion 92 and current regulating portion 90 of the electrical coil 88 and inner tube 86 back to the electrical connector 58 to form a glow plug circuit. The glow sheath 78 carries the supply voltage from the electrical connector 58 for the ion sensor circuit. When there is combustion in the cylinder 16,32, the burnt gases are ionized and conduct or carry current from the electrical connector 58 to the glow sheath 78 and through the ionized gas to an engine ground, which is the piston 22,36 or the shell 46. The exposed portion of the insulator 60 is disposed in the high temperature area of the glow sheath 78 which will burn off by glowing any soot and moisture formation on the insulator 60 that may create a short between the glow sheath 78 and the shell seat 53 to provide the soot self-cleaning feature of the ion sensor glow plug assembly 10. It should be appreciated that the matting 70 and/or coating 68 prevent soot such as carbon from seeping through the clearance between the insulator 60 and the glow sheath 78, resulting in bridging or shorting of the seal 72.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An ion sensor glow plug assembly comprising:
   a metal shell for attachment to a cylinder head of a compression ignition engine;
   a center terminal at least partially disposed in said metal shell and connected to a source of power to create a heating circuit; and
   a metal glow sheath disposed at least partially in said metal shell and about said center terminal; and
   an insulative seal disposed at least partially around said metal glow sheath to isolate said metal shell from said metal glow sheath to create an ion sensing circuit.

2. An ion sensor glow plug assembly as set forth in claim 1 wherein said center terminal is made of a metal material.

3. An ion sensor glow plug assembly as set forth in claim 1 wherein said metal glow sheath has a closed end spaced from an end of said center terminal.

4. An ion sensor glow plug assembly as set forth in claim 1 including an electrical coil disposed about a portion of said center terminal.

5. An ion sensor glow plug assembly as set forth in claim 4 wherein said electrical coil has a heating portion connected to said center terminal and a current regulating portion connected to said heating portion.

6. An ion sensor glow plug assembly as set forth in claim 4 including an inner tube disposed about a portion of said center terminal and connected to said electrical coil.

7. An ion sensor glow plug assembly as set forth in claim 1 including an insulator disposed about said metal glow sheath and at least partially in said metal shell and extending axially therefrom to clean off soot on said metal glow sheath.

8. An ion sensor glow plug assembly as set forth in claim 1 including a matting disposed within said metal shell adjacent said insulative seal to prevent soot or moisture from shorting said insulative seal.

9. An ion sensor glow plug assembly as set forth in claim 1 including a coating disposed within said metal shell adjacent said insulative seal to prevent soot or moisture from shorting said insulative seal.

10. An ion sensor glow plug assembly as set forth in claim 1 including a filling material disposed between said metal glow sheath and said center terminal.

11. An ion sensor glow plug assembly as set forth in claim 1 wherein said insulative seal is made of a glass material.

12. A self-cleaning ion sensor glow plug assembly for a compression ignition engine comprising:
    a metal shell for attachment to a cylinder head of the compressive ignition engine;
    a center terminal at least partially disposed in said metal shell and connected to a source of power to create a heating circuit;
    a metal glow sheath disposed at least partially about said center terminal and extending into said metal shell;
    an insulative seal disposed at least partially around said metal glow sheath and in said metal shell to isolate said metal shell from said metal glow sheath to create an ion sensing circuit; and
    an insulator disposed about said glow sheath and at least partially in said metal shell and extending axially therefrom to clean off soot on said glow sheath.

13. A self-cleaning ion sensor glow plug assembly as set forth in claim 12 wherein said glow sheath has a closed end spaced from an end of said center terminal.

14. A self-cleaning ion sensor glow plug assembly as set forth in claim 12 including an electrical coil disposed about a portion of said center terminal.

15. A self-cleaning ion sensor glow plug assembly as set forth in claim 14 wherein said electrical coil has a heating portion connected to said center terminal and a current regulating portion connected to said heating portion.

16. A self-cleaning ion sensor glow plug assembly as set forth in claim 15 including an inner tube disposed about a portion of said center terminal and connected to said electrical coil.

17. A self-cleaning ion sensor glow plug assembly as set forth in claim 12 including a matting disposed within said metal shell adjacent said insulator to prevent soot or moisture from shorting said insulative seal.

18. A self-cleaning ion sensor glow plug assembly as set forth in claim 12 including a coating disposed within said metal shell adjacent said insulative seal to prevent soot or moisture from shorting said insulative seal.

19. A self-cleaning ion sensor glow plug assembly as set forth in claim 12 including a filling material disposed between said metal glow sheath and said center terminal.

20. A self-cleaning ion sensor glow plug assembly for a diesel engine comprising:

a metal shell for attachment to a cylinder head of a compressive ignition engine;

a metal center terminal at least partially disposed in said metal shell;

an electrical coil disposed about a portion of said metal center terminal having a heating portion connected to said metal center terminal and a current regulating portion connected to said heating portion;

an inner tube disposed about a portion of said metal center terminal and connected to said current regulating portion and to a source of power to create a heating circuit;

a metal glow sheath disposed at least partially about said metal center terminal and extending into said metal shell;

a glass seal disposed in said metal shell and at least partially around said metal glow sheath to isolate said metal shell from said metal glow sheath to create an ion sensing circuit; and an insulator disposed about said metal glow sheath and at least partially in said metal shell and extending axially therefrom to clean off soot on said metal glow sheath.

* * * * *